United States Patent
Song et al.

(10) Patent No.: US 9,208,179 B1
(45) Date of Patent: Dec. 8, 2015

(54) COMPARING SEMI-STRUCTURED DATA RECORDS

(75) Inventors: Han See Song, San Jose, CA (US);
Antonio Nucci, San Jose, CA (US);
Qiang Ma, Highland Park, NJ (US)

(73) Assignee: Narus, Inc., Sunnyvale, CA (US)

( * ) Notice: Subject to any disclaimer, the term of this patent is extended or adjusted under 35 U.S.C. 154(b) by 669 days.

(21) Appl. No.: 13/481,567

(22) Filed: May 25, 2012

(51) Int. Cl.
*G06F 17/30* (2006.01)

(52) U.S. Cl.
CPC .... *G06F 17/30286* (2013.01); *G06F 17/30011* (2013.01); *G06F 17/30067* (2013.01); *G06F 17/30386* (2013.01); *G06F 17/30595* (2013.01); *G06F 17/30867* (2013.01)

(58) Field of Classification Search
CPC ............... G06F 17/30286; G06F 17/30386; G06F 17/30011; G06F 17/30067; G06F 17/30595; G06F 17/30867
USPC ................................. 707/791, 802, 822, 828
See application file for complete search history.

(56) References Cited

U.S. PATENT DOCUMENTS

| | | | | |
|---|---|---|---|---|
| 5,875,285 A | * | 2/1999 | Chang | 706/53 |
| 6,804,677 B2 | * | 10/2004 | Shadmon et al. | 707/752 |
| 7,734,556 B2 | * | 6/2010 | Tan et al. | 706/45 |
| 7,853,623 B2 | * | 12/2010 | Koike | 707/803 |
| 8,150,835 B2 | * | 4/2012 | Boldyrev et al. | 707/713 |
| 2005/0065967 A1 | * | 3/2005 | Schuetze et al. | 707/802 |
| 2006/0206466 A1 | * | 9/2006 | Boiscuvier et al. | 707/704 |
| 2008/0209340 A1 | * | 8/2008 | Tonse et al. | 715/745 |
| 2009/0087036 A1 | * | 4/2009 | Imaoka | 382/118 |
| 2009/0164464 A1 | * | 6/2009 | Carrico et al. | 707/716 |
| 2009/0327438 A1 | * | 12/2009 | Cheng et al. | 709/206 |
| 2010/0180337 A1 | * | 7/2010 | Bajekal | 726/19 |
| 2011/0145050 A1 | * | 6/2011 | Gross et al. | 705/14.25 |
| 2011/0153644 A1 | * | 6/2011 | Kosuru et al. | 707/769 |
| 2012/0078902 A1 | * | 3/2012 | Duboue et al. | 707/736 |
| 2012/0089622 A1 | * | 4/2012 | Fan et al. | 707/749 |
| 2012/0117076 A1 | * | 5/2012 | Austermann | 707/741 |

FOREIGN PATENT DOCUMENTS

EP        1072986 A2 * 10/1999 ............. G06F 17/30

* cited by examiner

*Primary Examiner* — Shahid Alam
(74) *Attorney, Agent, or Firm* — Kwan & Olynick LLP

(57) ABSTRACT

A method for comparing data records, including extracting, by a computer processor, alphanumeric tokens from a plurality of data records, wherein the plurality of data records are generated by a plurality of entities, generating, by the computer processor, a plurality of indexes each referencing an entity of the plurality of entities by at least one of the alphanumeric tokens that is associated with the entity, extracting target alphanumeric tokens from a target data record of a target entity, identifying a candidate entity from the plurality of entities based on the target alphanumeric tokens and a first index of the plurality of indexes, and calculating, by the computer processor, a first score representing a first similarity measure between a candidate data record selected from the plurality of data records that belongs to the candidate entity and the target data record of the target entity.

27 Claims, 6 Drawing Sheets

COMPARING SEMI-STRUCTURED DATA RECORDS

BACKGROUND OF THE INVENTION

1. Field of the Invention

The present invention relates to computers and computer networks. More particularly, the invention relates to comparing semi-structured data records.

2. Background of the Related Art

Structured data items, such as data records in a database generally have schematic information (e.g., database schema) describing the structure of underlying data fields and detail definition of each item in the data fields that allows computerized comparisons. In contrast, semi-structured data may have some structure (e.g., tags or key-value markers) that allows semantic separation of its alphanumeric components but each component does not have well defined format, and therefore difficult to be compared automatically. Examples of semi-structured data include network management messages, online social network (OSN) data records, emails, voice-over-IP (VoIP) headers and transcripts.

In network management, for instance, vast amount of network data, including device logs, traps, and alarms across different devices from different vendors have their own format. While there are rough standards in data formulation (e.g., IETF standards), they only contribute in separating fields inside device messages (e.g., XMLs (eXtensible Markup Languages) of SNMP (Simple Network Management Protocol)), leaving the real job of comparing and analyzing the messages to be manually done by network operators.

A social network is a social structure (e.g., community) made of members (e.g., a person) connected by social relationships such as friendship, kinship, relationships of beliefs, knowledge, prestige, culture, etc. Members of a social network often share interests and activities relating to such social relationships. For example, individual computers linked electronically could form the basis of computer mediated social interaction and networking within a social network community, referred to as an online social network (OSN). A social network service focuses on building online communities of people who share interests and/or activities, or who are interested in exploring the interests and activities of others. Most social network services are web based and provide a variety of ways (e.g., e-mail, instant messaging service, etc.) for users (or members) to interact socially.

Matching profiles of users across OSNs is a problem of great interest. Generally, only partial user profile information is available in a single OSN. Via the profile information overlap between different OSNs, profiles belonging to the same user can be concatenated to present a more complete profile, which can benefit personalize marketing, user online behavior analysis, etc. A number of previous works assess the feasibility of matching profiles across OSNs. These methods typically require large man/machine-hour to be practical or are restrictive in looking for matches. As a result, the growing size of today's information networks poses a scalability challenge to the schemes analyzing them. While the general similarity and distance measures such as edit distance and n-gram provides simple and clear ways to parse out the textual information for a small number of data records, the growing amount of string comparisons on networks with millions of profiles becomes a limiting factor for these methods. Further, even if the comparisons can be carried out somehow, the non-contextual, blind comparison leads to poor profile matching accuracy. For example, a comparison between user names, "Mary" and "Mark", are considered very similar under edit distance measure while "Bill" and "William" are not.

Extracting and matching personal profiles of email senders VoIP callers has similar challenges as the OSN data records.

SUMMARY

A method for comparing data records, including extracting, by a computer processor, alphanumeric tokens from a plurality of data records, wherein the plurality of data records are generated by a plurality of entities, generating, by the computer processor, a plurality of indexes each referencing an entity of the plurality of entities by at least one of the alphanumeric tokens that is associated with the entity, extracting target alphanumeric tokens from a target data record of a target entity, identifying a candidate entity from the plurality of entities based on the target alphanumeric tokens and a first index of the plurality of indexes, and calculating, by the computer processor, a first score representing a first similarity measure between a candidate data record selected from the plurality of data records that belongs to the candidate entity and the target data record of the target entity.

Other aspects and advantages of the invention will be apparent from the following description and the appended claims.

DETAILED DESCRIPTION

Figure 1:
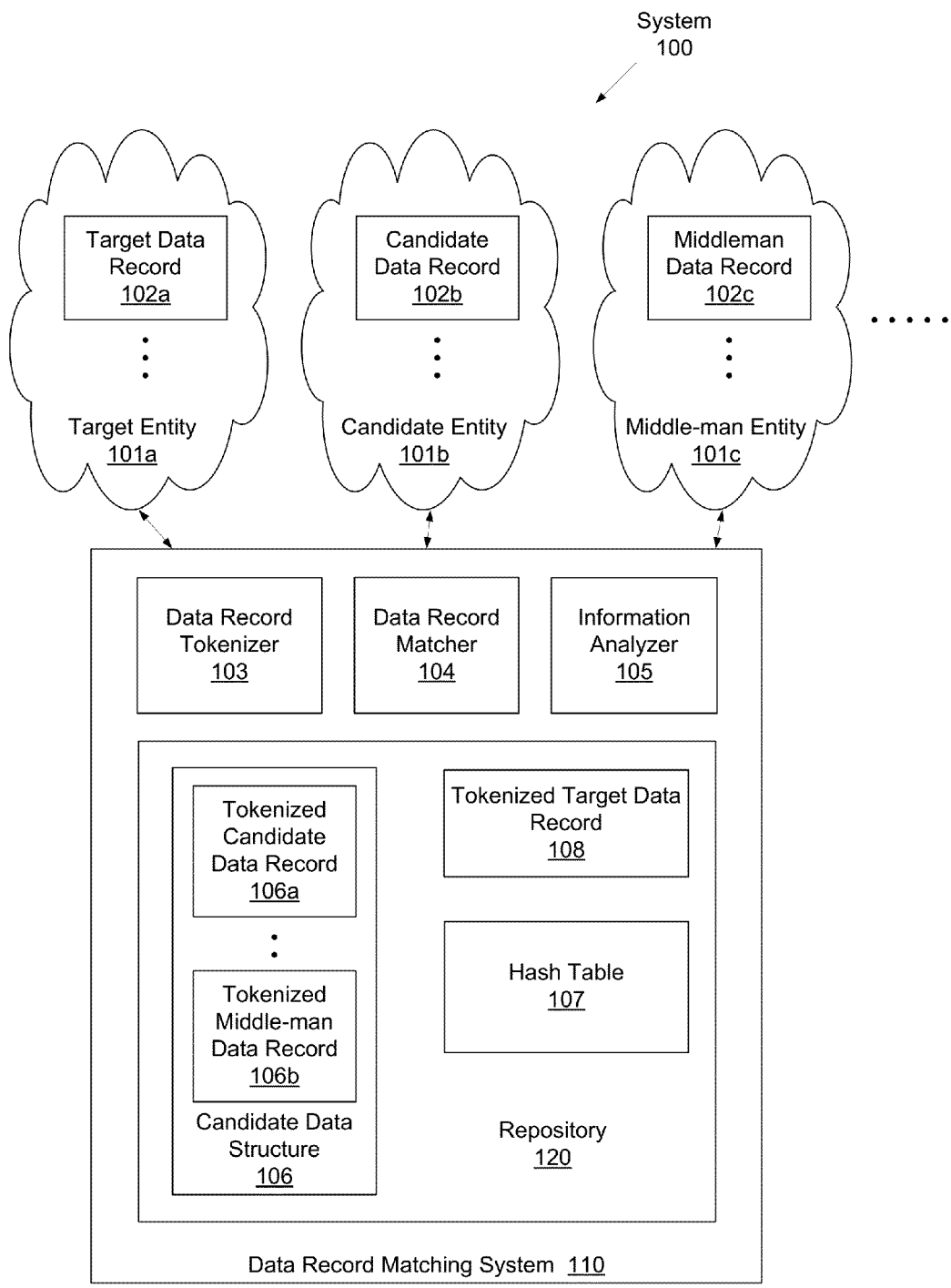
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a system and method to match data records. Once matched, the data records are joined, referred to as splicing or pair-wise data record joining. In one or more embodiments, the match and the pair-wise data record joining are further based on a data record of a third entity, referred to as the middle-man entity. In one or more embodiments, the data records may be one of network management messages, OSN user profiles, emails, VoIP call records, etc. In each embodiment, each data record contains elements (e.g., network message data elements such as CPU utilization level, available memory, addition of a new line card to accommodate more traffic, occurrence of operating system update, shutdown, reboot, etc., OSN user profile elements such as screen name, email address, first and last name, age, gender, residence address, birth date, etc., email elements such as sender, recipient, subject, send time, attachment, email body, etc., VoIP records elements such as VoIP call record header, caller ID, callee ID, call time, call duration, VoIP call conversation transcript, etc.) that are tokenized and hashed for efficient comparison.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes data record generating entities (e.g., target entity (101a), candidate entity (101b), middle-man entity (101c), etc.) where each data record generating entity generates one or more data records (e.g., target data record (102b), candidate data record (102b), middle-man data record (102c), etc.), and a data record matching system (110) having a data record tokenizer (103), a data record matcher (104), an information analyzer (105), and a repository (120) storing candidate data structure (106) of data records (e.g., stored as tokenized candidate data record (106a), tokenized middle-man data record (106b), etc.), a hash table (107), and a tokenized target data record (108) needing to be matched. Each of these data record generating entities (e.g., target entity (101a), candidate entity (101b), middle-man entity (101c), etc.) may be associated with wired/wireless portions of local area network, wide area network, Internet, and/or other computer and communication networks.

As noted above, the data record matching system (110) is configured to perform data record matching. The data records may be obtained either by using the API to query the data generating entities or by crawling and parsing publicly accessible network sources. In one or more embodiments, the data record matching system (110) is configured to obtain multiple data records (e.g., target data record (102b), candidate data record (102b), middle-man data record (102c), etc.) and to organize these data records in data structures (e.g., the candidate data structure (106) and associated hash table (107)) to facilitate the matching. For example, the target data record (102a) may be compared to the candidate data structure (106) storing information of multiple data records (e.g., the tokenized candidate data record (106a), etc.) with the help of the hash table (107) associated with the candidate data structure (106).

In one or more embodiments, the entities are network devices and the data records are network management messages (e.g., device logs, traps, alarms, etc.). For example, the network management messages may be generated to indicate an error condition. In this example context, the target entity (101a) and a candidate entity, based on a match found by the comparison, are identified as being equivalent to each other in the sense that their generated network messages are indicating the same error condition.

In one or more embodiments, the entities are OSN users and the data records are OSN user profiles. In this example context, the target entity and a candidate entity, based on a match found by the comparison, are identified as being equivalent to each other in the sense that they are the same physical person.

In one or more embodiments, the entities are email senders and the data records are emails (e.g., including data fields such as sender, recipient, subject, attachment, email body, etc.). In this example context, the target sender and a candidate sender, based on a match found by the comparison, are identified as being equivalent to each other in the sense that they are the same physical person.

In one or more embodiments, the entities are VoIP callers and the data records are VoIP call records (e.g., including VoIP headers, VoIP call conversation transcript, etc.). In this example context, the target caller and a candidate caller, based on a match found by the comparison, are identified as being equivalent to each other in the sense that they are the same physical person.

In one or more embodiments, the data record matching system (110) includes the data record tokenizer (103) that is configured to extract alphanumeric tokens from multiple data records (e.g., the target data record (102b), the candidate data record (102b), the middle-man data record (102c), etc.). In particular, these data records are generated by multiple entities (e.g., target entity (101a), candidate entity (101b), middle-man entity (101c), etc.) and contain information of these entities. In one or more embodiments, these data records are stored in the repository (120), for example in a tokenized format such as the tokenized candidate data record (106a) and the tokenized middle-man data record (106b) in the candidate data structure (106). In other examples, these data records may also be stored in other formats. In one or more embodiments, each attribute (e.g., name, birth date, email address, home address, etc.) of each element in each data record is analyzed using pre-determined de-limiters to extract alphanumeric tokens. In one or more embodiments, one or more of special character (also referred to as a symbol, such as any character that is neither an alphabet nor a numeral), space, and alphabet/numeral transition (i.e., alphabet to numeric and/or numeric to alphabet) is used as the de-limiters. For an OSN user profile example, alphanumeric tokens "william", "1953", "gmail", "corn", "8", "23", and "1953" may be extracted from the email address "william1953@gmail.com" and the birth date "8/23/1953" in a user profile (e.g., the candidate data record (102b)) of a user "William" in an OSN (e.g., the candidate entity (101b)). In addition, alphanumeric tokens "no", "1953", "3", "rd", and "street" may be extracted from the home address "no. 1953, 3rd street" in another user profile (e.g., the middle-man data record (102c)) of a user "Mary" in another OSN (e.g., the middle-man entity (101c)). Accordingly, all these alphanumeric tokens "william", "1953", "gmail", "corn", "8", "23", "no", "3", "rd", and "street" are stored in the candidate data structure (106). In one or more embodiments, common tokens (e.g., gmail, corn, no, rd, street, etc.) may be eliminated from the candidate data structure (106). For example, the extracted OSN alphanumeric tokens may be filtered using a pre-defined list of common tokens before stored in the candidate data structure (106). Those skilled in the art, with the benefit of this disclosure, will appreciate that the alphanumeric tokens may be extracted from other semi-structured data records, such as a network management message, an email, a VoIP call record, etc. in a similar manner.

In one or more embodiments, the data record tokenizer (103) is further configured to generate a number of indexes each referencing one of the aforementioned entities by at least one of the aforementioned alphanumeric tokens. Specifically, at least one of the alphanumeric tokens is extracted from the data record that belongs to the referenced entity. In one or more embodiments, these indexes are stored in the hash table (107) alphanumeric tokens as keys for looking up corresponding data record generating entities. In the context of OSN user profile, at least one of the OSN alphanumeric tokens is used as a key of the hash table (107) to reference a value identifying the OSN user in the hash table (107) who has a OSN user profile from which the at least one of the OSN alphanumeric tokens is extracted. Continuing with the OSN user profile example above, the hash table (107) returns the user "William" when the alphanumeric tokens "william", "gmail", "corn", "8", and "23", are used as keys, returns the user "Mary" when the alphanumeric tokens "no", "3", "rd", and "street" are used as keys, and returns both "William" and "Mary" when the user alphanumeric token "1953" is used as the key.

Based on the candidate data structure (106) populated with tokenized data records and the hash table (107) populated for reverse looking up of data record generating entities using the extracted alphanumeric tokens as keys, a data record (referred to as a target data record, such as the target data record (102a)) can be compared to all available data records in the candidate data structure (106) by comparing the extracted alphanumeric tokens in the following manner. In one or more embodiments, the data record tokenizer (103) is configured to extract target alphanumeric tokens from the target data record (102a) to form the tokenized target data record (108). Accordingly, the target data record (102a) is compared to the other data records by comparing alphanumeric tokens in the tokenized target data record (108) to alphanumeric tokens in the candidate data structure (106). For the aforementioned OSN user profile example where the target data record (108) is an OSN user profile, the tokenized target data record (108) may include the alphanumeric tokens "bill", "1953", "yahoo", and "com" extracted from the email address "bill1953@yahoo.com" in the target data record (108).

In one or more embodiments, the data record tokenizer (103) is configured to selectively augment the tokenized target data record (108) with a semantically equivalent addition before the comparison. In one or more embodiments, the alphanumeric tokenizer is configured to selectively augment each of the tokenized data records (e.g., the tokenized candidate data record (106a), tokenized middle-man data record (106b) in the candidate data structure (106) with a semantically equivalent addition before the comparison. For the OSN user profile example, the alphanumeric token "William" may be augmented by an additional alphanumeric token "Bill" and vice versa.

In one or more embodiments, the data record matching system (110) includes the data record matcher (104) that is configured to perform the aforementioned alphanumeric token comparison by first identifying at least one entity, based on the tokenized target data record (108) and at least one of the of indexes in the hash table (107). For example, each alphanumeric token of the tokenized target data record (108) is used as a key in an attempt to look up any candidate entity referenced by at least one index in the hash table (107). If no candidate entity can be found in the hash table (107) using all of the alphanumeric tokens of the tokenized target data record (108) as the keys, the target data record (102ba) is said to be not matching any of the available data records in the candidate data structure (106) and no more comparison is performed to conserve computing resources. If a candidate entity is found in the hash table (107) using at least one alphanumeric token of the tokenized target data record (108) as the key, this candidate entity in the candidate data structure (106) is selected and considered as potentially associated with the target data record (102a). Accordingly, any further comparison is limited to only information associated with this selected candidate entity. In one or more embodiments, more than one candidate entity may be selected and any further comparison is limited to only information associated with these selected candidate entities. For example, only those alphanumeric tokens associated with the selected candidate entity(s) are included in any further comparison to conserve computing resources. In one or more embodiments, certain alphanumeric tokens (e.g., "gmail", "yahoo", "com", etc.) commonly found in most of OSN users' profiles are not used for user profile matching. For example, the alphanumeric tokens "gmail", "yahoo", "com", etc. are ignored when selecting the candidate entity. Continuing with the OSN user profile example above, the users "William" and "Mary" are both selected as the candidate entities when user alphanumeric token "1953" of the tokenized target data record (108) is used as a key to look up the candidate entity in the hash table (107).

In one or more embodiments, the data record matcher (104) is further configured to calculate a score representing a similarity measure between a data record (e.g., candidate data record (101b)) that belongs to the selected candidate entity (e.g., candidate entity (102b)) and the target data record (102a)). If the score is less than a pre-determined threshold, no match is said to be found between the target data record (102a) and any available data record stored in the candidate data structure (106) and no more comparison is performed to conserve computing resources. If the score exceeds the pre-determined threshold, the data record (e.g., candidate data record (102b)) that belongs to the selected candidate entity (e.g., candidate data record (101b)) and the target data record (102a) are combined and stored as an expanded profile of the target entity. In this case, the selected candidate entity (e.g., candidate data record (101b)) is considered as equivalent to the target entity (101a). In the OSN user profile example, the target entity and the selected candidate entity are considered as having the same identity and are the same physical person. In one or more embodiments, the score is calculated based on a result of pair-wise comparison of all alphanumeric tokens in the tokenized target data record (108) against all alphanumeric tokens in a tokenized data record (e.g., the tokenized candidate data record (106a)) that is associated with the selected candidate entity in the candidate data structure (106). For example, the score may be proportional to a number of matching alphanumeric token pairs found in the pair-wise comparisons. Continuing with the OSN user profile example above, the score of similarity between the user profile of "William" and tokenized target data record (108) is 1 based on the matching user alphanumeric token "1953." Similarly, the score of similarity between the user profile of "Mary" and tokenized target data record (108) is also 1 based on the matching user alphanumeric token "1953." However, when the tokenized data records in the candidate data structure (106) are augmented with semantically equivalent tokens "william" and "bill", the score of similarity between the user profile of "William" and tokenized target data record (108) is increased to 2 based on the matching alphanumeric tokens "1953" and "william" equaling "bill." Accordingly, by properly setting the score threshold at 1.5, the tokenized target data record (108) is joined with the user profile of "William" instead of user profile of "Mary."

In one or more embodiments, the data record matcher (104) is further configured to compare two data records (e.g., the target data record (102a) and the candidate data record (102b)) with the help of a middle man (e.g., the middle-man data record (102c)). Additional details of such three-party comparison are described in reference to FIG. 2B below.

To further conserving the computing resources for performing the comparisons, the candidate data structure (106) is further partitioned based on one or more of a class, a type, and a length of the alphanumeric tokens such that the aforementioned pair-wise comparisons are limited to comparing only a pair of alphanumeric tokens both belonging to the same class, the same type, and/or the same length of alphanumeric tokens. In one or more embodiments, the class includes a key attribute class, a derivable attribute class, and a statistical attribute class, and the type includes an alphabetic type and a numeric type. Examples of the key attribute class, derivable attribute class, statistical attribute class, alphabetic type, and numeric type are described in reference to FIGS. 3A and 3B below.

In one or more embodiments, the data record matching system (110) includes the information analyzer (105) that is configured to analyze the expanded profile to generate a result. For the example where the data records are OSN user profiles, emails, and VoIP call records, the result may be an aggregated record report, such as a personal information report of the target entity. For example, while each of the OSN user profile making up the expanded profile may concentrate on one aspect of the OSN activities of the target entity, the combination of these aspects reflected in the expanded profile allows a more comprehensive personal information report of the target entity to be generated. For the other example where the data records are network management messages, the result may be a network error assessment that triggers a corrective action of the network error to be applied to the target entity and the candidate entity having matching data records based on the comparison.

Figure 2A:
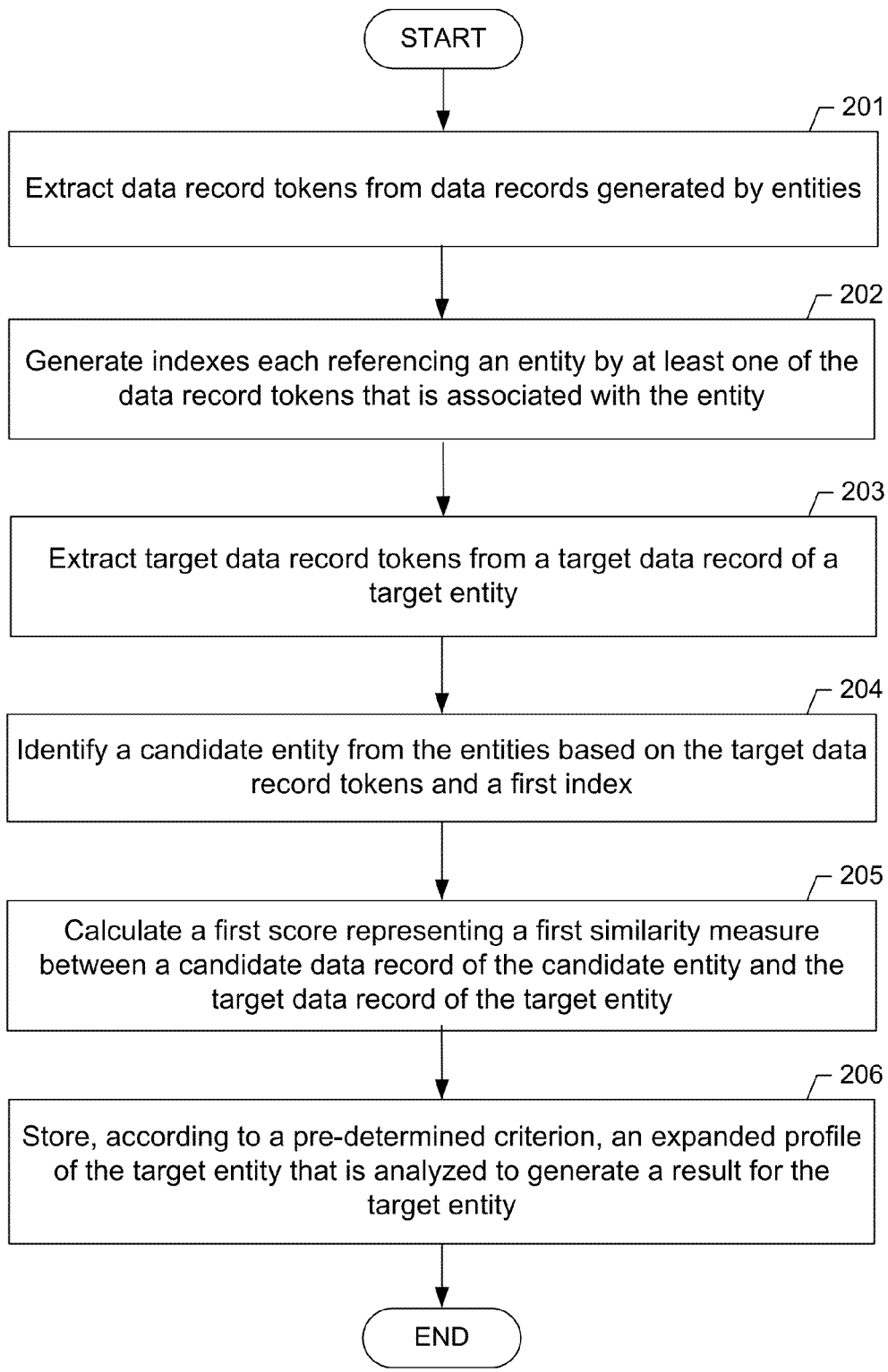
FIGS. 2A and 2B show a flowchart of a method according to aspects of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A.

In one or more embodiments, the method depicted in FIG. 2A processes semi-structured data records where the input data does not have schematic information but has some structure (e.g., tags or key-value markers that allows) that allows semantic separation of its components. Further, the method calculates score representing similarity measures for such semi-structured data records to make decision on whether to join them or not. In one or more embodiments of the invention, the method depicted in FIG. 2A may be practiced using system (100) described with respect to FIG. 1 above.

As noted above, examples of semi-structured data records include network protocols (e.g., packet trace in the form of HTML, XML, and other proprietary format with tags or labels), network application data (e.g., emails, transcripts of VoIP records), and online social network data (e.g., user profile, social association, and community information). While OSN user profiles have been used as examples in the description in reference to FIG. 1 above, additional example are briefly described here.

In the network management example, vast amount of network data, including device logs, traps, and alarms across different devices from different vendors have their own format. While there are rough standards in data formulation (e.g., IETF standards), they only contribute in separating fields inside device messages (e.g., XMLs of SNMP), leaving the real job of comparing and analyzing the messages to be manually done by network operators. The method depicted in FIG. 2A generates a comprehensive view in a large networked system with such heterogeneous components, based on an automatic way to combine the messages.

In the email example, personal profiles of email senders may be extracted and applied in spam filtering, fraud detection, and evolutionary study on the computer worm and virus dispersion, etc. The method depicted in FIG. 2A compiles collective knowledge on who this person is talking to (by referring to the destination info of his emails) and what attachment this person sends with what topic (by referring to the attachment and subject lines of emails), and use it in separating misbehaving users from the rest. While the message headers are well defined and can be parsed by machines, the text within subject lines and the email body may require domain knowledge to extract the semantic content.

In the VoIP call record example, the method depicted in FIG. 2A compiles personal profile on the people who call and receive VoIP calls. Similarly to the email analysis, by studying the topics of the peoples' messages, users can be identified who spread messages that pose threat to the public.

Initially in Step 201, alphanumeric tokens are extracted from data records (referred to as candidate data records) generated by entities (referred to as candidate entities). In one or more embodiments, elements of each data record are identified based on pre-determined schema of the data records such that alphanumeric tokens are extracted after each elements are parsed based on the pre-determined schema. For the OSN user profile example, OSN user profile attributes and token parsing rules are described in at least FIG. 3A and various tables of this disclosure.

In one or more embodiments, the alphanumeric tokens are selectively augmented with a semantically equivalent addition, which are stored together in a data structure that is partitioned based on the entities. For example, the data structure corresponds to the candidate data structure (106) shown in FIG. 1. In one or more embodiments, the data structure is further partitioned based on a class, a type, and/or a length of the alphanumeric tokens. In one or more embodiments, the class may be a key attribute class, a derivable attribute class, or a statistical attribute class, and the type may be an alphabetic type or a numeric type. OSN user profile examples of extracting alphanumeric tokens, supplementing them with semantically equivalent additions, and organizing them in the data structure are described in reference to FIGS. 3A and 3B below.

In Step 202, indexes are generated with each index referencing an entity by at least one of the alphanumeric tokens that is/are associated with the entity. In particular, the at least one of the alphanumeric tokens is/are extracted from a data record that is generated by the entity. In one or more embodiments, the indexes are stored in a hash table such that an alphanumeric token can be used as a key of the hash table to reference a value identifying an associated entity in the hash table. For example, the hash table corresponds to the hash table (107) shown in FIG. 1. OSN user profile examples of generating and using the hash table are described in reference to FIGS. 3A and 3B below.

In Step 203, target alphanumeric tokens are extracted from a target data record. In one or more embodiments, this extraction is similar to extracting alphanumeric tokens performed in Step 201 above.

In Step 204, a candidate entity is particularly identified from all the candidate entities, based on the target alphanumeric tokens and at least one of the indexes (referred to as the first index). In one or more embodiments, this particularly identified candidate entity (referred to either specifically as "selected candidate entity" or simply as "candidate entity" depending on the context) is identified by performing look up of the hash table using at least one of the target alphanumeric tokens. In one or more embodiments, the first index references the candidate entity in the hash table look-up. OSN user profile examples of identifying the selected candidate entity are described in reference to FIGS. 3A and 3B below.

In Step 205, a first score is calculated to represent a first similarity measure between one of the candidate data records that belongs to the selected candidate entity and the target entity profile of the target entity. In one or more embodiments, the first score is calculated based on comparing the target alphanumeric tokens and a portion of all previously extracted alphanumeric tokens that are associated with the selected candidate entity. Further, the comparison is performed based on one of the class, the type, and the length of the tokens. Limiting the score calculation and associated comparison to a subset of all of the extracted alphanumeric tokens by considering the selected candidate entity, the class, the type, and the length effectively conserves the computing resources for performing the data record comparison/matching. OSN user profile examples of calculating the score are described in reference to FIG. 3B below.

In Step 206, by evaluating the first score according to a pre-determined criterion, a combination of the two compared data records are stored as an expanded profile of the target entity. Accordingly, the expanded profile is analyzed to generate a result of the target entity.

In one or more embodiments, the data records include OSN user profiles, emails, and/or VoIP call records, and the result includes a personal information report of the target entity who may be an OSN user, email sender, and/or VoIP caller. In particular, the target entity and the candidate entity are identified as being equivalent. Said in other words, the two are considered as the same person.

In one or more embodiments, the data records include OSN user profiles, emails, and/or VoIP call records, and the result includes a network error assessment/report of the target entity who may be a router, a switch, a hub, a server, a client, or other types of network device. In particular, the target entity and the candidate entity are identified as being equivalent. Said in other words, the two are considered as reporting the same network error.

Additional details of method Step 206 with respect to the pre-determined criterion are described in reference to FIG. 2B below. In addition, the OSN user profile examples of storing the combined data records (referred to as splicing the data records) and generating a personal information report are described in reference to FIGS. 3A and 3B below.

Figure 2B:
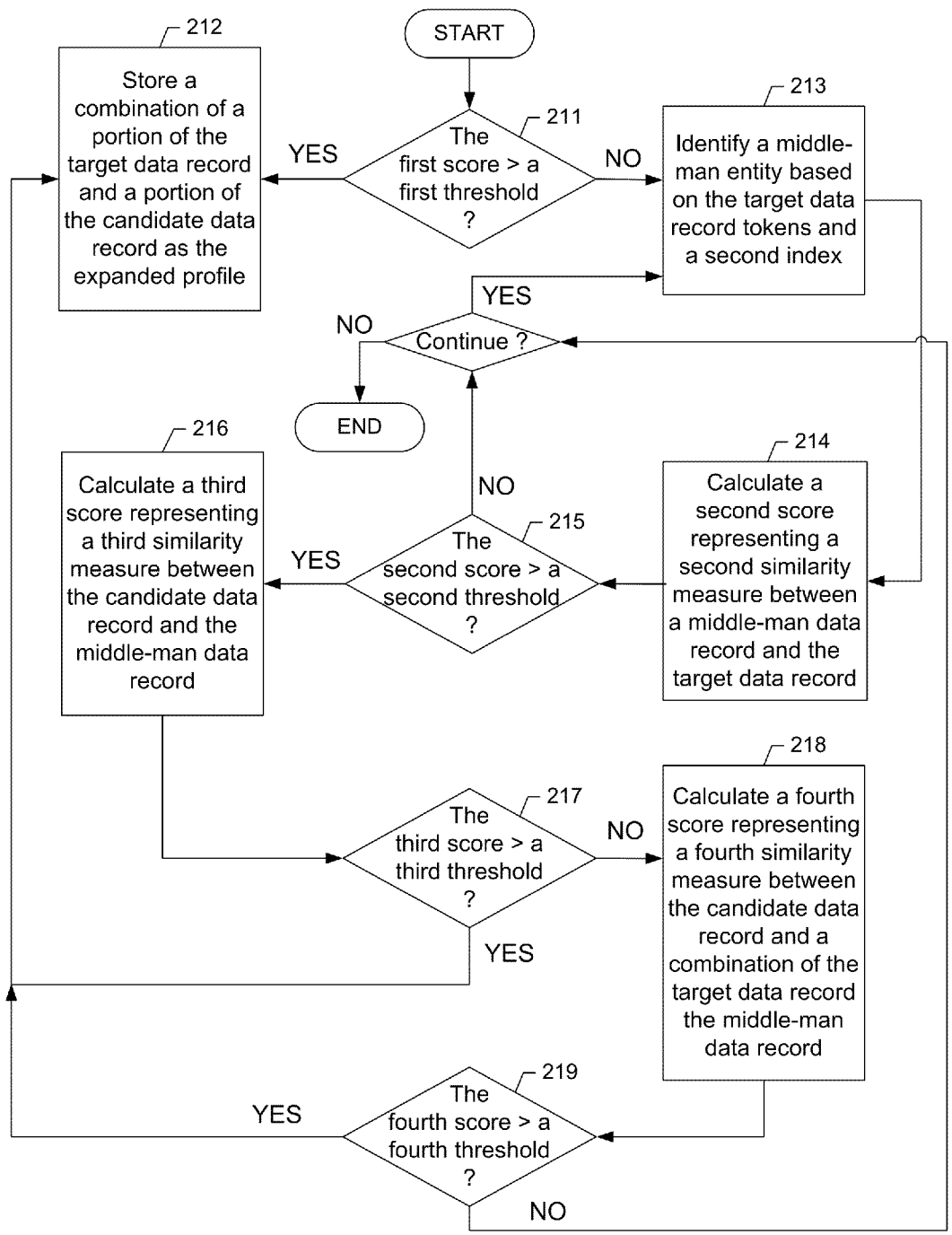

FIG. 2B depicts a flowchart of a method in accordance with one or more embodiments of the invention. Specifically, FIG. 2B describes details of method Step 206 depicted in FIG. 2A above. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments of the invention, the method depicted in FIG. 2B may be practiced using system (100) described with respect to FIG. 1 above.

Initially in Step 211, a decision is made regarding whether the first score calculated in Step 205 of FIG. 2A exceeds a first pre-determined threshold. If the answer is yes, the method proceeds to Step 212 where a combination of the target data record (or a portion thereof) and the candidate data record (or a portion thereof) are stored together (i.e., spliced or combined) as an expanded profile of the target entity. As noted above, the expanded profile is then analyzed to generate a result of the target entity. If the answer of Step 211 is no, the method proceeds to Step 213 where a middle-man entity is identified based on the target data record and a second index. In one or more embodiments, the second index references the middle-man entity when one of the alphanumeric tokens of the target data record is used as a key in the hash table look up.

The hash table look up performed in Step 213 is similar to that described in reference to Step 204 of FIG. 2A above.

In Step 214, a second score is calculated that represents a second similarity measure between one (referred to as a middle-man data record) of the candidate data records that belongs to the identified middle-man entity and the target entity profile of the target entity. In one or more embodiments, the second score is calculated based on comparing the target alphanumeric tokens and a portion of all previously extracted alphanumeric tokens that is associated with the identified middle-man entity. Said in other words, the second score is calculated based on comparing alphanumeric tokens of the target data record and the middle-man data record. Further, the comparison is performed based on one of the class, the type, and the length of the tokens.

In Step 215, a decision is made with respect to whether the second score exceeds a second pre-determined threshold. If the answer is no, the method proceeds to Step 213, if continued, where another middle-man entity may be identified, otherwise the method ends. If the answer of Step 215 is yes, the method proceeds to Step 216 where a third score is calculated to represent a third similarity measure between the candidate data record and the middle-man data record. In one or more embodiments, the third score is calculated in a similar manner as how the first and second scores are calculated.

In Step 217, a decision is made with respect to whether the third score exceeds a third pre-determined threshold. If the answer is yes, the method proceeds to Step 212 where a combination of the target data record (or a portion thereof) and the candidate data record (or a portion thereof) are stored together (i.e., spliced or combined) as an expanded profile of the target entity. This scenario is referred to as a middle man's help as a bridge, which is described in reference to TABLEs 6-10 as an example. If the answer of Step 217 is no, the method proceeds to Step 218 where a fourth score is calculated to represent a fourth similarity measure between the candidate data record and a combination of the target data record and the middle-man data record. In one or more embodiments, the fourth score is calculated in a similar manner as how the first, second, and third scores are calculated.

In Step 219, a decision is made with respect to whether the fourth score exceeds a fourth pre-determined threshold. If the answer is no, the method proceeds to Step 213, if continued, where another middle-man entity may be identified, otherwise the method ends. If the answer is yes, the method proceeds to Step 212 where a combination of the target data record (or a portion thereof) and the candidate data record (or a portion thereof) are stored together (i.e., spliced or combined) as an expanded profile of the target entity. This scenario is referred to as a middle man's help as an enhancer, which is described in reference to TABLEs 6-10 as an example.

As noted above, the first, second, third, and the fourth scores may be calculated in a similar manner. In one or more embodiments, the first, second, third, and the fourth pre-determined thresholds may be the same. In one or more embodiments, the first, second, third, and the fourth pre-determined thresholds may be adjusted separately and each have a different value.

Figure 3A:
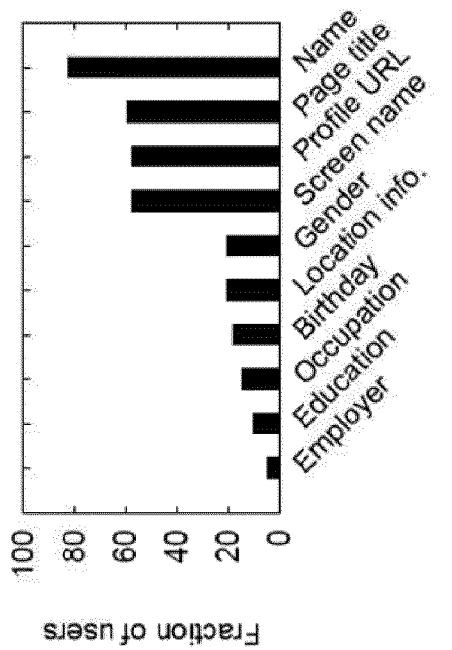
FIGS. 3A and 3B show an application example in accordance with embodiments of the invention.
Figure 3A:
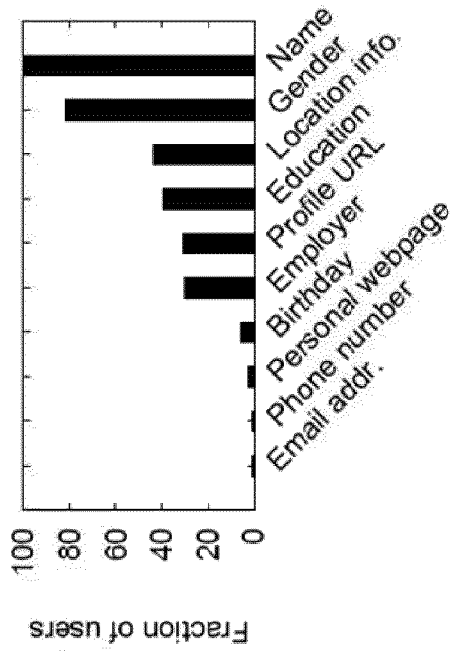
Figure 3A:
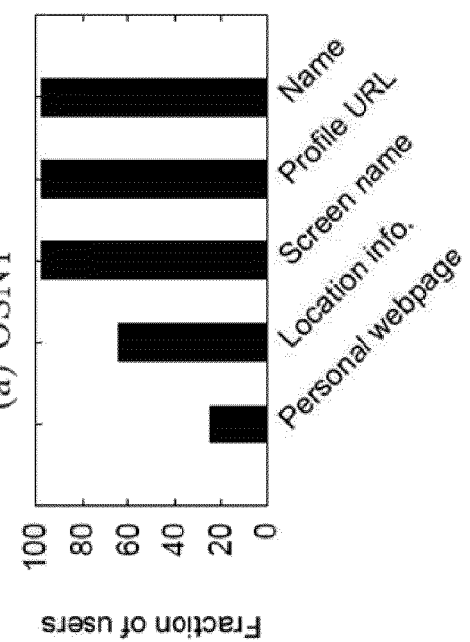
Figure 3B:
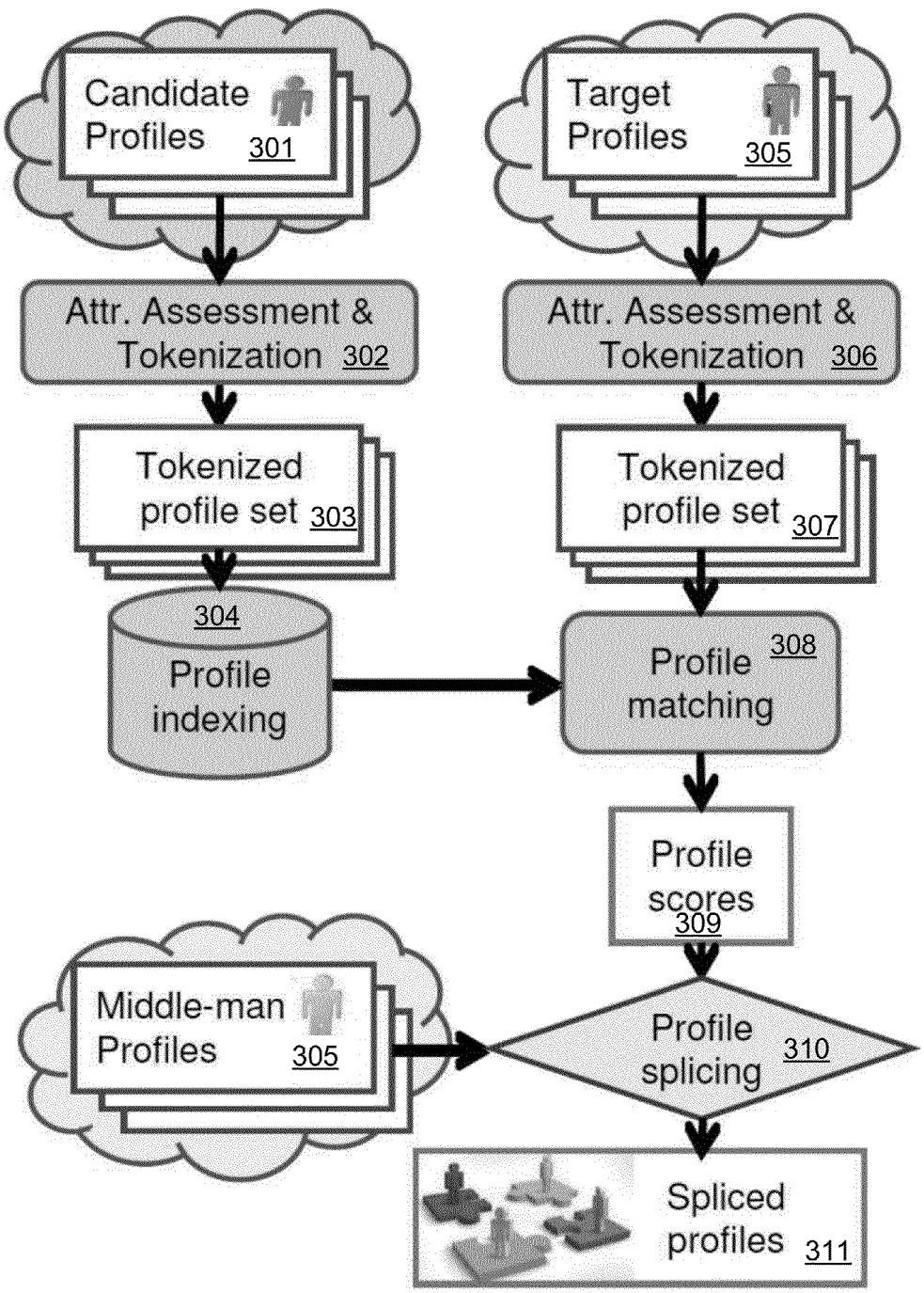

FIGS. 3A and 3B show an application example of comparing OSN user profiles in accordance with embodiments of the invention. This example application may be practiced using the system (100) of FIG. 1 and based on the method described with respect to FIGS. 2A and 2B above. FIG. 3A shows the percentage of profile attributes discovered for three example OSNs, namely OSN1, OSN2, and OSN3, respectively. One observation is that many (over 20%-40%) users reveal nonsensitive information (e.g., resident city, hometown, schools, employers, etc.) that can promote local gathering or finding of real-world acquaintances. Very few users, on the other hand, disclose sensitive information, such as phone number, email, and personal webpage. Another observation is that not all attributes equally contribute to joining the profiles. Similarity in account screen names, for example, gives more confidence in joining while similarity in the list of favorite music albums does not.

FIG. 3B shows an example workflow of comparing/matching OSN data records of two OSNs referred to as a candidate OSN and a target OSN, which are denoted by $N^c$ and $N^t$, respectively in the discussion below. As shown, the candidate profiles (301) and the tokenized profile set (303) correspond to the candidate data record (102b) and tokenized candidate data record (106a), respectively in FIG. 1. Similarly, the target profiles (305) and tokenized profile set (307) correspond to the target data record (102a) and tokenized target data record (108), respectively in FIG. 1. Further, attribute assessment & tokenization (302) and (306), profile matching (308) and profile splicing (310) are performed by the data record tokenizer (103) and data record matcher (104), respectively in FIG. 1.

Let $P=\{p_i\}$ be a set of profiles of an OSN denoted by N. Let $T(p_i)=\{t(p_{i,j})\}$ be a set of tokenized attributes (or tokens), where a profile $p_i$ may have multiple tokens $t(p_{i,j})$ where $j=1$ through $|T(p_i)|$. A summary of notations is listed in TABLE 1.1. Similar notations for the example semi-structured data records for network messages, emails, and VoIP call records are listed in TABLES 1.2, 1.3, and 1.4, respectively.

An example algorithm of the profile matching (308) uses four similarity functions $f_p$, $f_q$, $f_r$, and $f_s$, representing perfect match, quasi-perfect match, partial match, and statistical match, respectively that are commonly denoted by "f.". Each function $f.(p^c_i, p^t_j)$ takes candidate profile $p^c_i$ and target profile $p^t_j$ as inputs and outputs a similarity score vector (i.e., profile scores (309)) based on analyzing different aspects of profiles. The objective of the example algorithm is to obtain a collection M of matching profile pairs $(p^c_i, p^t_j)$, where each matching profile pairs has a linear combination of similarity scores of f.( )s that exceeds a threshold T. This can be represented mathematically as $$M(P^c, P^t) = \{(p^c_i, p^t_j) | \Sigma C \cdot f.(p^c_i, p^t_j) > \tau\}.$$

Each pair of profiles in M that satisfies the above condition are considered as belonging to the same user and combined as one of the spliced profiles (311).

TABLE 1.1

| Notation | Definition |
| --- | --- |
| N | online social network, $N = [N^c | N^t]$. |
| $N^c$ | candidate OSN. |
| $N^t$ | target OSN. |
| $p_i$ | a profile of N. |
| $T(p_i)$ | token set of profile $p_i$. |
| $t(p_i, j)$ | a token j of profile $p_i$. |
| $t_k(p_i)$ | a key token. |
| $t_d(p_i)$ | a derived token. |
| $t_s(p_i)$ | a statistical token. |
| $f_p(p^c_i, p^t_j)$ | Perfect match function. |
| $f_q(p^c_i, p^t_j)$ | Quasi-perfect match function. |
| $f_r(p^c_i, p^t_j)$ | Partial match function. |
| $f_s(p^c_i, p^t_j)$ | Statistical match function. |
| $M(P^c, P^t)$ | matching pairs of $p^c_i, p^t_j$. |

TABLE 1.2

| Notation | Definition |
| --- | --- |
| N | universe of network devices, $N = [N^c | N^t]$. |
| $N^c$ | candidate network devices. |
| $N^t$ | target network devices. |
| $p_i$ | a device message in N. |
| $T(p_i)$ | token set of device messages $p_i$. |
| $t(p_i, j)$ | a token j of device messages $p_i$. |
| $t_k(p_i)$ | a key token. |
| $t_d(p_i)$ | a derived token. |
| $t_s(p_i)$ | a statistical token. |
| $f_p(p^c_i, p^t_j)$ | Perfect match function. |
| $f_q(p^c_i, p^t_j)$ | Quasi-perfect match function. |
| $f_r(p^c_i, p^t_j)$ | Partial match function. |
| $f_s(p^c_i, p^t_j)$ | Statistical match function. |
| $M(P^c, P^t)$ | matching pairs of $p^c_i, p^t_j$. |

TABLE 1.3

| Notation | Definition |
| --- | --- |
| N | entire set of email users, $N = [N^c | N^t]$. |
| $N^c$ | candidate email users. |
| $N^t$ | target email users. |
| $p_i$ | an email in N. |
| $T(p_i)$ | token set of email $p_i$. |
| $t(p_i, j)$ | a token j of email $p_i$. |
| $t_k(p_i)$ | a key token. |
| $t_d(p_i)$ | a derived token. |
| $t_s(p_i)$ | a statistical token. |
| $f_p(p^c_i, p^t_j)$ | Perfect match function. |
| $f_q(p^c_i, p^t_j)$ | Quasi-perfect match function. |
| $f_r(p^c_i, p^t_j)$ | Partial match function. |
| $f_s(p^c_i, p^t_j)$ | Statistical match function. |
| $M(P^c, P^t)$ | matching pairs of $p^c_i, p^t_j$. |

TABLE 1.4

| Notation | Definition |
| --- | --- |
| N | entire set of VoIP users, $N = [N^c | N^t]$. |
| $N^c$ | candidate VoIP users. |
| $N^t$ | target VoIP users. |
| $p_i$ | a VoIP message log in N. |
| $T(p_i)$ | token set of VoIP message $p_i$. |
| $t(p_i, j)$ | a token j of VoIP message $p_i$. |
| $t_k(p_i)$ | a key token. |
| $t_d(p_i)$ | a derived token. |
| $t_s(p_i)$ | a statistical token. |
| $f_p(p^c_i, p^t_j)$ | Perfect match function. |
| $f_q(p^c_i, p^t_j)$ | Quasi-perfect match function. |
| $f_r(p^c_i, p^t_j)$ | Partial match function. |
| $f_s(p^c_i, p^t_j)$ | Statistical match function. |
| $M(P^c, P^t)$ | matching pairs of $p^c_i, p^t_j$. |

Because different OSN focuses on different aspects of users' OSN activity, the information contained in the data records of the different OSNs vary. A semantic analysis on the attributes of profiles may provide a way to compare a pair of heterogeneous profiles from two OSNs $N^c$ and $N^t$ side-by-side. However, the comparison between $p^c_i$ and $p^t_j$ requires significant effort in building an ontology tree to identify semantically equal attributes. In the dynamic Internet environment where the existing services constantly update and new services open up at a dizzying pace, such ontology-based approach can be outdated, error-prone, and costly. As an effort to generalize the attributes of profiles from across different OSNs and to use a generic set of algorithms to compare them, an approach that uses minimal amount of OSN specific knowledge is used. For example, attribute assessment & tokenization (302) and (306) categorize attributes into the following three different classes to allow flexible matching between attributes within a class, as opposed to generating a class for each attribute and imposing a restrictive attribute-by-attribute matching.

1. Key Attribute Class.

This class of profile attributes uniquely identifies an online user from others. An attribute is considered as a key attribute when only a few users, if not one person, share the same attribute. Examples of such attributes include user ID, user name, email address, and phone number. Exact matches between the attributes in this class allow direct associations of profiles from different OSNs with highest confidence.

2. Derivable Attribute Class.

This class of attributes is used in deriving new attributes and perform partial match of profiles. A pair of email addresses, for example, looseturkey@gmail.com and looseturkey80@blogspot.com have some likelihood of belonging to the same person, specially if the two associated profiles also additionally have e.g., year of birth as 1980. Derivable attribute class includes attributes that provide ways to realize such partial comparison. The derivable attributes include birth days, street names of address, email handles (as in <handle>@<domain.com>}, etc.

3. Statistical Attribute Class.

This class of profile attribute can relate profiles by stochastic matching. While this class of attributes is not sufficient to uniquely identify a person, it can add confidence to true match or reject false match when the other classes of attributes cannot provide a clear decision. Birth day, gender, marital status, schools attended, employers, and city of residence are example attributes.

It is not always clear which attribute belongs to which class. Take birth year of 1980 for instance, it functions as a derivable attribute because it can be a part of email handle (e.g., looseturnkey80). At the same time, it can function as a statistical attribute because it separates the profile from other users not born in 1980. For this reason, soft clustering approach is used to label a single attribute into multiple categories in case its class membership is ambiguous. Classifications of the attributes of three example OSN profile sets based on FIG. 3A are summarized in TABLE 2.1 where "K" stands for Key attribute, "D" stands for Derivable attribute and "S" stands for Statistical attribute. The letter in each cell indicates the class of corresponding attribute; empty cells represent unavailable attribute in the corresponding OSN. Similar classifications of the attributes for the example semi-structured data records for network messages, emails, and VoIP call records are listed in TABLES 2.2, 2.3, and 2.4, respectively.

TABLE 2.1

| Attributes | OSN 1 | OSN 2 | OSN 3 |
|---|---|---|---|
| OSN ID | K | K | K |
| Name | K | K | K |
| Screen name |  | K | K |
| Email addr. | K |  |  |
| Phone number | K |  |  |
| Profile URL | K | K | K |
| Page title |  | K |  |
| Personal webpage | D |  | D |
| Birthday | D, S | D, S |  |
| Employer | D, S | D, S |  |
| Occupation |  | D, S |  |
| Education | D, S | D, S |  |
| Location info. | D, S | D, S | D, S |
| Gender | S | S |  |

TABLE 2.2

| Attributes | Message 1 | Message 2 | Message 3 |
|---|---|---|---|
| Router device ID | K | K | K |
| Interface ID | K | K | K |
| IP address | K | K | K |
| Circuit ID | K | K | K |
| Timestamp | D | D | D |
| Error code | K | K | K |
| Detailed event message | D, S | D, S | D, S |

TABLE 2.3

| Attributes | Email 1 | Email 2 | Email 3 |
|---|---|---|---|
| From/Sender/Reply-to | K, D | K, D | K, D |
| To/cc/bcc | K, D | K, D | K, D |
| Orig-date | D | D | D |
| Message-id | K | K | K |
| Subject | D | D | D |
| Comments | D | D | D |
| Keywords | D | D | D |
| Resent info | K | K | K |
| Trace info | K | K | K |
| Optional field | K | K | K |
| Email body | D, S | D, S | D, S |

TABLE 2.4

| Attributes | VoIP 1 | VoIP 2 | VoIP 3 |
|---|---|---|---|
| Caller/callee phone numbers | K | K | K |
| Caller/callee screen names | K, D | K, D | K, D |
| Connection time | D | D | D |
| Call Duration | D | D | D |
| Message Transcripts | D, S | D, S | D, S |

In order to perform an efficient comparison between profiles, attributes of profiles are tokenized into meaningful units. As opposed to n-gram based character-wise tokenization, attribute values are separated into alphabetic tokens and numeric tokens, which are treated as atomic tokens without any further tokenization. These alphabetic tokens and numeric tokens serve as the fundamental unit in the profile similarity assessment. In the atomic token creation process, symbols and special characters are used as separators (i.e., de-limiters). Each atomic token falls into one of the three categories of key token, derived token, and statistical token based on TABLE 2.1. The atomic tokenization allows computationally efficient exact match to be performed between tokens instead of computationally expensive soft, partial string matches.

1. Key Tokens.

Key tokens $t_k(p_i)$ for profile $p_i$ are obtained from the key attributes, where a single symbol or multiple consecutive symbols (i.e., special characters) are replaced by a single symbol signifier ".". For an exemplary screen name "Marcy**Walker80", the key token is recorded as $t_k(p_i)$=marcy.walker.80 as a single atomic token. By preserving the ordering of alphabetic, numeric, and special characters in the attribute string, the forthcoming profile similarity measurement retains the structural information crucial to perfect matching $f_p(\ )$ Also by generalizing separator format, matching algorithm can match a pair of tokens while accepting slight difference in their presentation (e.g., use of different symbols between terms).

2. Derived Tokens.

Derived tokens $t_d(p_i)$ are created from key and derivable attribute classes by separating alphabetic and numeric parts.

In case of a key attribute, if the set of derived tokens $T_d(p_i)$ from a pair of profiles have significant overlap, they may be compared by partial matching schemes (i.e., quasi-perfect matching $f_q(\ )$ and partial-matching $f_p(\ )$). In the example of screen name "Marcy**Walker80", three tokens of $T_d(p_i)=$ {marcy, walker, 80} are extracted. Note that the key token is a concatenation of derived tokens with the original order preserved but symbol(s) replaced by the signifier ".".

3. Statistical Tokens.

Statistical tokens $t_s(p_i)$ are extracted from statistical attribute class. The statistical tokens are reserved to be used when both key token and derived token comparisons could not yield any positive relation. While the statistical tokens are by no means unique, if two profiles match on one or more of the statistical tokens, further comparisons focus on a smaller subsets of candidate profiles than the entire population of $P^c$ (i.e., $|P^c|$).

The statistical tokens are usually generalizable into a single format for comparison across different profile formats. Gender, for example, is tokenized into numerical values ranging from 0 to 3, representing "not available", "male", "female", "both", respectively. Information with geographic location (e.g., resident city, state) is translated into their representative zip-codes to avoid string match.

Domain knowledge may be used to add intelligence into tokenization. In order to maximize the probability of the partial matches, domain knowledge is used as supplemental information. In case of a date (e.g., a birth date "Mar. 6th, 1980"), most popular variants of the tokens are generated into derived token set td(pi)={march, mar, 3, 6th, 6, 1980, 80}. User full name is also used as domain knowledge. Here, with the help of a name-abbreviation conversion table, the first character and the abbreviated form of the name, along with the full first and last name are associated. Following the method, user name "William Valentine" is derived into derived token set td(pi)={w, william, b, bill, v, valentine}. Additional domain knowledge examples are listed in TABLE 3.1 below. In particular, name abbreviation [1, 15] refers to pre-determined database of equivalent names and name abbreviations. Further, keyword of profile URL is extracted based on the domain knowledge parsing rule, which strips "scheme://domain:port" portion of absolute URLs and extract the fragment identifier portion of the remaining paths. From a URL "http://pro.imdb.com/name/ab1234" with the format of "scheme://domain/path/sub-path", for example, the URL extraction rule takes the sub-path of the URL, "ab1234", that corresponds to the identifier of a profile into its derived token set. In this context, the formatting of URL into "scheme://domain/path/sub-path" is referred to as the domain knowledge. In summary, if an OSN user profile attribute or extracted token is related to a person's name and/or date/time, semantically equivalent tokens are identified based on the domain knowledge regarding name and date/time format. If an OSN user profile attribute or extracted token is related to a screen name, phone number, or URL, derived tokens are extracted based on the domain knowledge regarding screen name, phone number, or URL format.

TABLE 3.1

| Attribute | Derived Token Set |
| --- | --- |
| Full Name | First character, name abbreviation [1, 15] plus full first and last names. E.g. "William Valentine", is derived into {"w", "william", "b", "bill", "v", "valentine"}. |
| Screen Name | Alphabetic and numeric tokens separated by symbols and special characters. E.g. |

TABLE 3.1-continued

| Attribute | Derived Token Set |
| --- | --- |
| | "===Marcy**Walker80===", is derived into {"marcy", "walker", "80"} |
| Date | Full month, three characters month abbreviation, numeric month, day, full four digit year, and last two digit of year. E.g. "March 6th, 1980", is derived into ("march", "mar", "3", "6", "1980", "80"). |
| Phone Number | Full phone number, area. code, and last four digits. E.g. (123)-456-6789 is derived into {123, 6789, 1234566789} |
| Profile URL | Keyword of a profile URL. E.g. "http://pro.imdb.com/name/ab1234" is derived into {"ab1234"} |

Similar domain knowledge examples for the example semi-structured data records for network messages, emails, and VoIP call records are listed in TABLES 3.2, 3.3, and 3.4, respectively. For the example of network messages, depending on a router's role, a single router may have multiple interfaces assigned with either IP address (in case of IP network) or circuit ID (in case of SONET). By translating IP address to interface ID, network operator can identify casual relationships in cascaded errors between interfaces with seemingly disjoint roles.

TABLE 3.2

| Attribute | Derived Token Set |
| --- | --- |
| IP Address | Translating network type-specific address format (e.g., IP address) to network type-agnostic interface ID reveals unobvious connectivity between heterogenous network interfaces. In a network interconnecting an interface T1_1/1/1:1 of router R1 (mapped to an IP network 192.168.1.2) to an interface C2_21212:2 of router R2 (mapped to a SONET circuit DHEC 111111), reference to IP "192.168.1.2" in SYSLOG of router R1 is translated to a generic form of interface ID "T1_1/1/1:1" to help the causal analysis under erroneous conditions. |
| Circuit ID | Translating circuit ID to network type-agnostic interface ID allows discovery of spatial relations between heterogenous network interfaces. Reference to SONET circuit ID "DHEC 111111" in SYSLOG of router R2 is translated to generic interface ID "C2_2/2/2:2". |
| Timestamp | Standardizing timestamps into GMT and reformatting into POSIX time allows causality analysis over time. E.g. "2012-04-30 14:43:33Z" is translated to POSIX time of "1335797013". |

TABLE 3.3

| Attribute | Derived Token Set |
| --- | --- |
| Email address | Email handle and domain separated. Alphabetic and numeric tokens separated by symbols and special characters as well. E.g. "marcy.walker80@mail.com", is derived into {"marcy", "walker", "80", "mail.com"} |
| Orig-Date | Standardizing timestamps into GMT and reformatting into POSIX time allows causality analysis over time. E.g. "2012-04-30 14:43:33Z" is translated to POSIX time of "1335797013". |

TABLE 3.4

| Attribute | Derived Token Set |
| --- | --- |
| Screen Name | Alphabetic and numeric tokens separated by symbols and special characters. E.g. "===Marcy**Walker80===", is derived into {"marcy", "walker", "80"} |

TABLE 3.4-continued

| Attribute | Derived Token Set |
|---|---|
| Phone Number | Full phone number, area code, and last four digits. E.g. (123)-456-6789 is derived into {123, 678, 1234566789} |
| DateTime | Standardizing timestamps into GMT and reformatting into POSIX time allows causality analysis over time. E.g. "2012-04-30 14:43:33Z" is translated to POSIX time of "1335797013". |

Scalability of user profile matching may be improved by fine-grained token binning. A brute force matching by pair-wise comparison between all tokens of all $P^c$ and $P^t$ will result in a prohibitive amount of comparisons even for exact string matches, considering average 24 tokens per user and 11,974 users in a common OSN. Since the match only conducts exact token string comparisons (as opposed to soft, partial string match), comparing tokens with different length can be excluded. Therefore, computation resource can be conserved by only comparing tokens with same length and character set type (e.g., alphabetic or numeric). In particular, multiple t(p) are grouped based on same length and same type. TABLE 4 shows groupings of example tokens listed in TABLE 3.1. TABLE 4 is equally applicable to the example semi-structured data records for network messages, emails, and VoIP call records.

TABLE 4

| Charset type | length | Token bin |
|---|---|---|
| Alphabetic | 1 | b, w, v |
| | 3 | mar |
| | 4 | bill |
| | 5 | march, marcy |
| Numeric | 1 | 3, 6 |
| | 3 | 123 |
| | 4 | 1980, 6789 |

Experiments based on example data sets show that this scheme saved 70% of comparisons compared to the brute force way by pair-wise comparison between all tokens of all $P^c$ and $P^t$. This saved not only the computation time but the memory footprint of tokens, adding scalability in handling large-scale datasets.

When matching two profiles by comparing the tokens from them, non-contextual and blind comparison may lead to poor matching accuracy. For example, a comparison between user names, "Mary" and "Mark", are considered very similar under edit distance measure. As noted above, profile strings are tokenized into semantic maintaining atomic tokens so that exact token string comparisons are performed in the profile matching process. This promotes the efficiency of token sets comparison. Given a number of profiles in $N^c$, the profile comparison between multiple pairs between $P^c$ and $P^t$ requires O($|P^t|$ to the power of $|P^c|$) comparisons if it is done in the brute force, all-pair comparison method. To efficiently compare only a selected subset of profiles, the profile indexing (304) is performed, which is a token indexing scheme using a hash table and is described below.

The four profile similarity scoring functions described above are designed to take token sets (of a profile) as input, not the profiles. If a pair of profiles being compared do not share any commonality in their tokens, it is not necessary to compare them as the scoring functions will univocally return scores of 0s. Based on this observation, tokens of candidate profiles are indexed in a way to reduce/eliminate unnecessary comparisons. In order to uniquely identify a user, OSNs issue profile identifier (either in numeric or alpha-numeric string) to every profile. For each OSN two token hash tables are created, one for key tokens $T_k(p)$ from all candidate profiles $P^c$, and another one for derived tokens $T_d(p)$ from all candidate profiles $P^c$. The tokens are hashed into their respective hash tables such that their hash table keys are token values and hash table values are lists of profile IDs associated to the token. In the query stage, the hash table is queried ' with a target token to obtain a list of candidate profile IDs that are associated to the token value. If two profiles' token sets do not have any token in common, similarity scores do not need to be calculated for these two profiles. Without candidate profile pruning, a target profile in an example data set has to be compared with all 11,974 candidate profiles. After pruning, the target profile only has to compare with 143 candidate profiles on average, saving 98.8% of profile comparisons in the example OSN profile comparison experiment.

In the profile matching (308), the similarity of a candidate profile $p^c$ in $N^C$ is compared with target profile $p^t$ in $N^t$ through the aforementioned four different scoring functions of perfect match, quasi-perfect match, partial match, and statistical match functions, each focusing on capturing different aspects of true identities behind various OSN profiles. Tokens matched between profiles may be weighted using the commonly used Inverse Document Frequency (IDF) weights:

$$\omega(t) = \log \frac{|P|}{|\{P'\} : t \in P'\}|}$$

where P is the entire set of profiles and P' is a subset of profiles that contain token t. Each of these matching functions generates a particular similarity measure between the candidate profile $p^c$ in $N^c$ and the target profile $p^t$ in $N^t$. All similarity measures generated by these matching functions are collectively referred to as the profile scores (309), which are described in detail below.

1. Perfect Match.

Perfect match looks for the exact match between entire strings of candidate profile attributes and target profile attributes. Thus, in this matching, the key tokens of a profile $p^c$ (i.e., $t_k(p^c, \bullet)$) are compared against the key tokens of a profile $p^t$ (i.e., $t_k(p^t, \bullet)$). Perfect match score $S_p$ is defined as below to be the number of key tokens shared by two profiles' key token sets, normalized by the token's frequency.

$$S_p(p^c, p^t) = \sum_{T \in T_k(p^c, \cdot) \cap T_k(p^t, \cdot)} \omega(T).$$

2. Quasi-Perfect Match.

The idea behind matching derived to key tokens is to assess the possibility of constructing a key token of a target profile using partial, derived tokens from a candidate profile. First, the set of derived tokens $t_d(p^c, \bullet)$ of a candidate profile is matched against the set of key tokens $t_k(p^t, \bullet)$ from a target profile. Because a key token $t_k(p^t, i)$ can have n atomic segments (either alphabetic or numeric), these derived tokens are matched with $t_d(p^c, \bullet)$. For example, let $t_k(p^t, i)$= "bill.89.penn" with three atomic segments. If $p^c$ has user name "William", birthday in "1989", and attended a school in Pennsylvania, and thus its derived atomic token set $t_d(p^c, \bullet)$= {w, bill, william, 1989, 89, pa, penn, Pennsylvania}, $p^t$ and $p^c$ can be matched from the quasi-perfect match by matching $t_k(p^t, i)$ to any three of the eight tokens in $t_d(p^c, \bullet)$.

To conserve computation resources, only alphabetic segments of a key token need to be matched with an alphabetic derived token with the same length (i.e., same number of characters). Similarly, only numeric segments of a key token need to be matched with a numeric derived token. Thus, in real application, "bill" in $t_k(p^t, i)$ only gets to be compared with {w, bill, william, pa, penn, Pennsylvania} in $t_d(p^c, \cdot)$.

Let $\hat{T}_k(p^t, i)$ be the set of atomic segments of $t_k(p^t, i)$, quasi-perfect match score for a single target key token $t_k(p^t, i)$ is computed as $$\frac{\sum_{T \in \{\hat{T}_k(p^t, i) \cap T_d(p^c, i)\}} \omega(T)}{\sum_{T \in \{\hat{T}_k(p^t, i)\}} \omega(T)}.$$

After comparing all $t_d(p^c, \cdot)$ against $t_k(p^t, \cdot)$ (i.e., derived-to-key match), all to match key tokens from both target and candidate set. The quasi-perfect match score $S_q$ is computed as below.

$$S_q(p^c, p^t) = \sum_{i=1}^{|T_k(p^t, \cdot)|} \left( \frac{\sum_{T \in \{\hat{T}_k(p^t, i) \cap T_d(p^c, i)\}} \omega(T)}{\sum_{T \in \hat{T}_k(p^t, i)} \omega(T)} \right) + \sum_{i=1}^{|T_k(p^c, \cdot)|} \left( \frac{\sum_{T \in \{\hat{T}_k(p^c, i) \cap T_d(p^t, i)\}} \omega(T)}{\sum_{T \in \hat{T}_k(p^c, i)} \omega(T)} \right)$$

3. Partial Match

Despite the name, partial string comparison is not performed in partial match (or in any other match). Instead, exact string match is performed between atomic tokens, which are parts of attributes, hence the name. Even if two profiles $p^c$ and $p^t$ belongs to a single person, the tokens inside them may not perfectly match. Partial match searches for slightest overlap between meaningful units of profiles by performing all possible comparisons between atomic and derived tokens of $p^c$ and $p^t$. The Partial match score $S_r$ counts the number of derived tokens shared between the two profiles' derived token sets, and gets normalized by the size of derived token sets in comparison. The possibility of applying locality sensitive hashing in the score estimation allows computationally lighter construction of the score as the equation below.

$$S_r(p^c, p^t) = \frac{\sum_{T \in t_d(p^c, \cdot) \cap t_d(p^t, \cdot)} \omega(T)}{\sum_{T \in t_d(p^c, \cdot) \cup t_d(p^t, \cdot)} \omega(T)}$$

4. Statistical Match.

As a reinforcement to the matching scores obtained from the above schemes, the match between the statistical tokens, $t_s(p^c, i)$ and $t_s(p^t, i)$ provides an added level of confidence. The scoring for matching two statistical tokens is provided by a probability based on the amount of ties in the entire observation. Take gender for example. Even if $p^c$ and $p^t$ are both female, the probability of the match has to be denominated by the amount of total female population. Let $\bar{t}_s$ be a predicate for equivalence between $t_s(p^c, i)$ and $t_s(p^t, i)$, $$\bar{t}_s(p^c, p^t, i) = \begin{cases} 1 & \text{if } t_s(p^c, i) = t_s(p^t, i) \\ 0 & \text{otherwise} \end{cases}.$$

Because the statistical score $S_s(p^c, p^t)$ should be proportional to the rarity of a positive match, it is set to be complementary to the match probability such that $$S_s(p^c, p^t) = \sum_{i=1}^{|t_s(p^c, \cdot)|} 1 - \frac{\bar{t}_s(p^c, p^t, i)}{t_s(p, i)}.$$

Devising different scoring functions is motivated by the fact that a single function cannot capture similarities of all possible profile pairs. TABLE 5 demonstrates it by showing the amounts of ground truth pairs identified by each scoring function. Although functions may capture same pairs and create overlaps, taking the union of them generates the largest coverage.

TABLE 5

| OSN pair | Can be matched (%) | | | |
|---|---|---|---|---|
| | $f_p()$ | $f_q()$ | $f_r()$ | $f_s()$ |
| OSN1 vs. OSN2 | 13.3 | 22.6 | 23.9 | 6.3 |
| OSN1 vs. OSN3 | 17.7 | 26.8 | 29.7 | 15.9 |
| OSN2 vs. OSN3 | 23.5 | 40.8 | 40.8 | 4.1 |

Once the similarity scores (i.e., the profile scores (309)) are computed, OSN profiles of a user can be joined in the profile splicing (310) step based on the scores. Since all three types of scores deliver different semantics and have different ranges of values, thresholds are separately identified for determining the positive match. The application of thresholds for each of the score leads to the understanding of the dynamics of scores such as the significance and sensitivity of the scoring functions. Among many schemes available for decision making, a regression scheme may be used. Because the three scores have variable range of values based on the tokens they process, it is difficult to apply decision schemes that bases on the absolute value of scores (i.e., majority voting). Regression, on the other hand, provides an objective way to fit the thresholds to the data set irrespective of the scale of values. To prevent over-fitting due to an over-constrained system (i.e., the equation has far smaller number of unknowns than the number of equations ($3 \ll |P^c|*|P^t|$)), Ridge regression, known to those skilled in the art, may be used that imposes a penalty term $\lambda$ on the complexity of model and minimize the penalized residual sum of squares (RSS).

An example data set is split into training and testing set: out of the total users from each OSN, a random half is chosen as training set and the other half as testing set. Let X be an input matrix with pairs of candidate and target profiles from the training set on the rows and the three scores $S_p$, $S_q$, and $S_r$ on the column. Let y be an observation vector with the ground truth matches annotated as 1s. The Ridge coefficient vector $\beta$ can be computed by $$\beta = (X^T X + \lambda I)^{-1} X^T y$$

where I is the identity matrix.

The components of vector $\beta$ are thus the three coefficients for scores of $S_p$, $S_q$, and $S_r$, and a linear combination of these scores present a threshold T. Applying $\tau$ to the testing set of $P^c$ and P', a subset of $P^c$ and $P^r$ is obtained that contains composite data records referred to as the spliced profiles (311).

As noted above, different OSNs have their own purpose and can only cover a part of a user's social life. For example, a personal information oriented OSN 1 user may provide her entire educational experience (e.g., from elementary school to college) on her profile page to help her finding old classmates. But this same user may only want to put the highest education on her professional profile of professional information oriented OSN 2, rendering pair-wise comparison to result in a score close to 0. These seemingly dissimilar profiles of two OSNs may be matched by adding auxiliary information of a third OSN 3, referred to as gaining the help of middle-man profiles (305). While the example is described with only one additional OSN, those skilled in the art, with the benefit of this disclosure, will appreciate that the application of middle-man's help can be applied with auxiliary information from multiple OSNs.

TABLE 6.1 shows data records P1 and P2 of a single user that are obtained from OSN 1 and OSN 2, respectively. In particular, the OSN profile attributes include screen name, employer name, user name, email address, home town, zodiac information, school, personal website, birthday, etc.

TABLE 6.1

| | |
|---|---|
| $p_1$ | {Screen name: ninja78}, {Employer: Pz Hospital} |
| $p_2$ | {Name: Bob Tween}, {MSN: looseturkey@msn.com}, {Hometown: Olympia, WA}, {Zodiac: Aquarius} |

TABLE 6.2

| | |
|---|---|
| $p_1$ | {Router: R1}, {Interface ID: T1_1/1/1:1 (IP Address: 192.168.0.2)}, {Error code: SYS-1-CPU-RISING-THRESHOLD}, {Time stamp: 1335797013} |
| $p_2$ | {Router: R2}, {Interface ID: C2_2/2/2:2 (Circuit DHEC: 111111)}, {Error code: SNMP-WARN-LINK-DOWN}, {Time stamp: 1335797300} |

TABLE 6.3

| | |
|---|---|
| $p_1$ | {Sender: m.twain@narus.com}, {Receiver: w.valentine@boeing.com}, {Subject: regarding our Splicer software}, {Keywords: release, date, Splicer} |
| $p_2$ | {Sender: mark78@mail.com}, {Receiver: 02152012@boeing.com}, {Subject: launch party}, {Message keywords: product, launch, party} |

TABLE 6.4

| | |
|---|---|
| $p_1$ | {Time stamp: 1335797013}. {Caller: (512) 111-2222}. {Callee: (215) 333-4444}, {Message keywords: farm, fertilizer, buy} |
| $p_2$ | {Time stamp: 1335950000}, {Caller: (512) 111-6666}, {Callee: (215) 333-7777}, {Message keywords: explosion, attack} |

As can be seen from these example data records, no relationship could be inferred about P1 and P2. Continuing the above case, this user's profile P3 from OSN 3 contains information that helps matching P1 and P2 either as a bridge or as an enhancer.

Similar data records for the example semi-structured data records for network messages, emails, and VoIP call records are listed in TABLES 6.2, 6.3, and 6.4, respectively.

TABLE 7.1 shows an example of P3 for the first case of bridging.

TABLE 7.1

| | |
|---|---|
| $p_3$ | {Screen name: ChristmasCarol}, {School: Rutgers University}, {My sites: OSN1.com/blog/looseturkey, OSN2.com/ninja-photo-gallery} |

TABLE 7.2

| | |
|---|---|
| $p_3$ | {Router: R1}, {Interface ID T3_3/3/3:3 (IP Address: 192.168.0.3)}, {Error code: Link-1-UP-DOWN}. {Time stamp: 1335797013}. |

TABLE 7.3

| | |
|---|---|
| $p_3$ | {Sender: w.valentine@boeing.com}, {Receiver: mark78@mail.com}, {Subject: RE: launch party}, {Message keywords: dress code, casual, Splicer} |

TABLE 7.4

| | |
|---|---|
| $p_3$ | {Time stamp: 1335889000}, {Caller: (512) 111-7777}, {Callee: (215) 333-8888}, {Message keywords: fertilizer, explosive} |

Here, P3 can be strongly connected to both P1 and P2 when the URL provided in his profile gets parsed. Specifically, "looseturkey" matches P2's MSN handle (captured by perfect match), and "ninja-photo-gallery" matches P1's screen name by token "ninja" which earns relatively high weight by being more unique than the subsequent tokens of "photo" and "gallery" in quasi-perfect match.

Similar data records for the example semi-structured data records for network messages, emails, and VoIP call records are listed in TABLES 7.2, 7.3, and 7.4, respectively.

TABLE 8 shows an example of P3 for the second case of enhancing.

TABLE 8

| | |
|---|---|
| $p_3$ | {Name: Tween}, {Scr_name: ninja}, {B-day: 01/25/78}, {From: WA} |

Here, P3 makes a high confidence match with P1. Specifically, the similarity of the screen name attributes measured by $f_q(t_d(P1, \text{ninja78}), t_k(P3, \text{ninja}))$ and the similarity of birth years measured by $f_r(t_d(P2, \text{ninja78}), t_d(P3, 01/25/78))$ are both high. By joining these two profiles P1 and P3 as P1,3, it holds more complete information on the true identity as shown in TABLE 9.1.

TABLE 9.1

| | |
|---|---|
| $p_{1,3}$ | {Name: Tween}, {Screen name: ninja, ninja78}, {Birthday: 01/25/78}, {From: WA}, {Employer: Pz Hospital} |

TABLE 9.2

| | |
|---|---|
| $p_{1,3}$ | {Time stamp: 1335797013}, {Router: R1}, {Interface ID: T1_1/1/1:1 (IP: 192.168.0.2), T3_3/3/3:3 (IP: 192.168.0.3)}, {Error code: SYS-1-CPU-RISING-THRESHOLD, Link-1-UP-DOWN} |

TABLE 9.3

| | |
|---|---|
| $p_{1,3}$ | {Sender: m.twain@narus.com, w.valentine@boeing.com}, {Receiver: w.valentine@boeing.com, mark78@mail.com}, {subject: regarding our Splicer software, RE: launch party}, {keywords: release, date, Splicer, dress code, casual} |

TABLE 9.4

| $p_{1,3}$ | {Time stamp: 1335797013, 1335889000}, {Caller: (512) 111-2222, (512) 111-7777}, {Callee: (215) 333-4444, (215) 333-8888}, {Message keywords: farm, fertilizer, buy, explosive} |
|---|---|

Matching P1,3 against P2, following tokens overlaps: {Tween, 25, Olympia, WA, Aquarius—January 25}. In both cases, the middle-man, P3, associates the seemingly irrelevant profiles.

Similar data records for the example semi-structured data records for network messages, emails, and VoIP call records are listed in TABLES 9.2, 9.3, and 9.4, respectively.

Table 10.1 provides all tokens of P1, P2, P3 as a bridge, and P3 as an enhancer, supplemented by domain knowledge and categorized by token type and length.

TABLE 10.2

| Token types | Character Length | P1 | P2 | P3 as bridge |
|---|---|---|---|---|
| Key tokens | | R1, 192.168.0.2, T1_1/1/1:1, SYS-1-CPU-RISING-THRESHOLD | R2, DHEC: 111111, C2_2/2/2:2, SNMP-WARN-LINK-DOWN | R1, 192.168.0.3, T3_3/3/3:3, LINK-1-UP-DOWN |
| Alphabetical derived tokens | 2 | | | UP |
| | 3 | SYS, CPU | | |
| | 4 | | SNMP, WARN, LINK, DOWN | LINK, DOWN |
| | 6 | RISING | | |
| | 9 | THRESHOLD | | |
| Numerical derived tokens | 1 | 1 | | 1 |
| | 10 | 1335797013 | 1335797300 | 1335797013 |

TABLE 10.3

| Token types | Character Length | P1 | P2 | P3 as bridge |
|---|---|---|---|---|
| Key tokens | | m.twain@narus.com, w.valentine@boeing.com | mark78@mail.com, 02152012@boeing.com | w.valentine@boeing.com, mark78@mail.com |
| Alphabetical derived tokens | 1 | m, w | | w |
| | 2 | | | re |
| | 4 | date | mark | code, mark |
| | 5 | twain | party | party, dress |
| | 6 | | launch | launch, casual |
| | 7 | product, release, splicer | product | splicer |
| | 9 | regarding, valentine | | valentine |
| Numerical derived tokens | 2 | | 78, 02, 15, | 78 |
| | 4 | | 2012 | |
| | 8 | | 02152012 | |

TABLE 10.1

| Token types | Character Length | P1 | P2 | P3 as bridge (first case) | P3 as enhancer (second case) |
|---|---|---|---|---|---|
| Key tokens | | | ninja.78 | bob.tween, looseturnkey | christmas.carol | tween, ninja |
| Alphabetical derived tokens | 1 | | b, r, t | | t |
| | 2 | pz | wa | | wa |
| | 3 | | Bob | | Jan |
| | 5 | ninja | tween | carol, ninja, photo | tween, ninja |
| | 6 | | Robert | | |
| | 7 | | olympia, msn.com | rutgers, gallery | january |
| | 8 | hospital | aquarius | | |
| | 9 | | | christmas | |
| | 10 | | washington | university | washington |
| | 12 | | looseturnkey | looseturnkey | |
| Numerical derived tokens | 2 | 78 | | | 01, 25, 78 |
| | 4 | 1978 | | | 1978 |

Similar tables for the example semi-structured data records for network messages, emails, and VoIP call records are listed in TABLES 10.2, 10.3, and 10.4, respectively.

TABLE 10.4

| Token types | Character Length | P1 | P2 | P3 as bridge |
|---|---|---|---|---|
| Key tokens | | 5121112222, 2153334444 | 5121116666, 2153337777 | 5121117777, 2153338888 |
| | 3 | buy | | |
| | 4 | farm | | |
| | 6 | | attack | |
| | 9 | | explosion | explosive |
| | 10 | fertilizer | | fertilizer |
| Numerical derived tokens | 2 | 512, 111, 215, 333 | 512, 111, 215, 333 | 512, 111, 215, 333 |
| | 4 | 2222, 4444 | 6666, 7777 | 7777, 8888 |
| | 10 | 1335797013 | 1335950000 | 1335889000 |

The middle-man's help can be formally formulated as below. Let $N^c$, $N^t$, and $N^m$, represent the candidate OSN, the target OSN, and the middle-man OSN, respectively. Also let T represent the threshold for the scoring functions. Define an evaluation function $Eval(p^t, p^c, \tau)$, where if two profiles $p^t$ and $p^c$ are similar, the linear combination of three scores ($S_r$, $S_q$, $S_r$)$>=\tau$ and $Eval(p^t, p^c, \tau)=1$; on the contrary, if the linear combination of the three scores ($S_r$, $S_q$, $S_r$)$<\tau$, then $Eval(p^t, p^c, \tau)=0$. Accordingly, the two scenarios of using middle-man's help is formally described as below:

1. As a Bridge.

Suppose Eval(pt, pc, τ)=0, Eval(pt, pm, τ)=1, and Eval(pc, pm, τ)=1. Because profile similarity is transitive, Eval(pt, pc, τ) is over-written to 1 to indicate that pt and pc belong to the same user.

2. As an Enhancer.

Suppose Eval($p^t$, $p^c$, τ)=0, Eval($p^t$, $p^m$, τ)=1, and Eval($p^c$, $p^m$, τ)=0. But the merged profile by $p^t$ and $p^m$, denoted by $p^t \cup p^m$, is similar to $p^c$, denoted by Eval($p^t \cup p^m$, $p^c$, τ)=1, Eval($p^t$, $p^c$, τ) is over-written to 1 to indicate that $p^t$ and $p^c$ belong to the same user.

Given two users $p^t$ and $p^c$ to be compared, if the evaluation on their similarity scores is greater than τ, then $p^t$ and $p^c$ can be spliced. Otherwise, every profile from a middle-man OSN is evaluated to determine if it can serve as a bridge or an enhancer, in which case $p^t$ and $p^c$ can be spliced. If all the above matching attempts fail, $p^t$ and $p^c$ are not spliced more evidences can be discovered to indicate otherwise.

Figure 4:
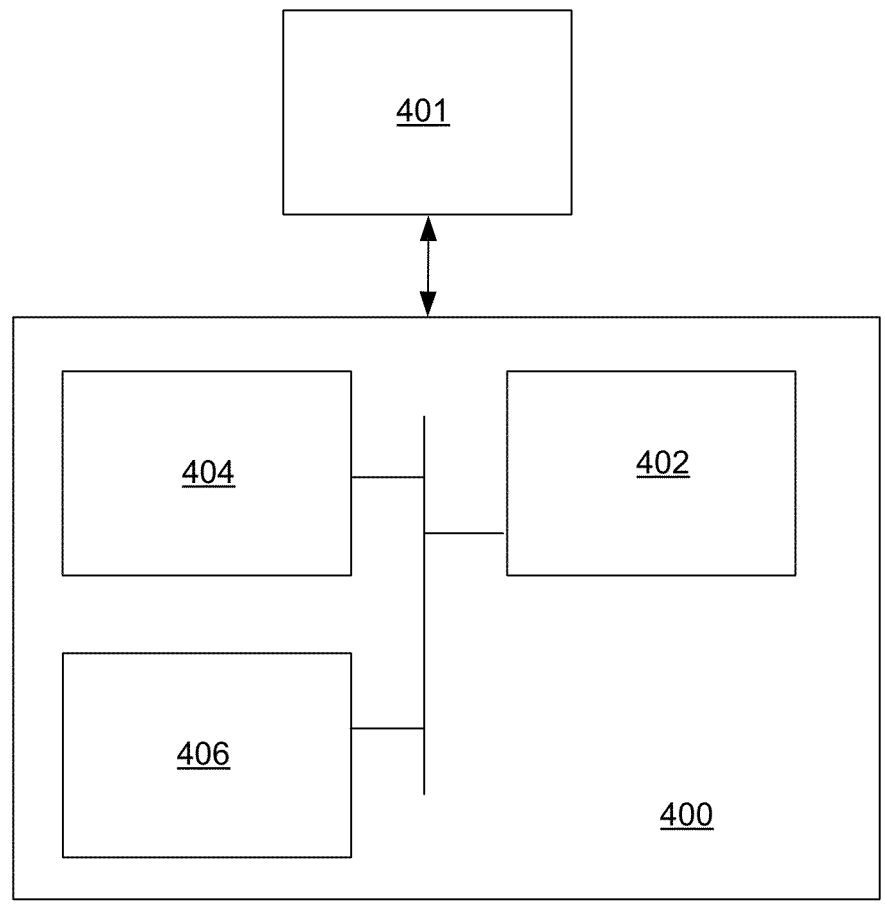
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for comparing data records, comprising:
   extracting, by a computer processor, alphanumeric tokens from a plurality of data records, wherein the plurality of data records is generated by a plurality of entities, wherein the plurality of entities includes network devices, wherein the plurality of data records includes semi-structured data records and network management messages;
   generating, by the computer processor, a plurality of indexes each referencing an entity of the plurality of entities by at least one of the alphanumeric tokens that is associated with the entity;
   extracting target alphanumeric tokens from a target data record of a target entity;
   identifying a candidate entity from the plurality of entities based on the target alphanumeric tokens and a first index of the plurality of indexes;
   calculating, by the computer processor, a first score representing a first similarity measure between a candidate data record selected from the plurality of data records that belongs to the candidate entity and the target data record of the target entity; and
   storing, in response to the first score exceeding a first pre-determined threshold, a combination of a portion of the target data record and a portion of the candidate data record as an expanded profile of the target entity.

2. The method of claim 1, further comprising:
   identifying, in response to the first score being less than a first pre-determined threshold, a middle-man entity from the plurality of entities based on the target alphanumeric tokens and a second index of the plurality of indexes;
   calculating a second score representing a second similarity measure between a middle-man data record selected from the plurality of data records that belongs to the middle-man entity and the target data record of the target entity;
   calculating, in response to the second score exceeding a second pre-determined threshold, a third score representing a third similarity measure between the candidate data record and the middle-man data record; and
   storing, in response to the third score exceeding a third pre-determined threshold, a combination of a portion of the target data record and a portion of the candidate data record as an expanded profile of the target entity.

3. The method of claim 1, further comprising:
   identifying, in response to the first score being less than a first pre-determined threshold, a middle-man entity from the plurality of entities based on the target alphanumeric tokens and a second index of the plurality of indexes;
   calculating a second score representing a second similarity measure between a middle-man data record selected from the plurality of data records that belongs to the middle-man entity and the target data record of the target entity;
   calculating, in response to the second score exceeding a second pre-determined threshold, a third score representing a third similarity measure between the candidate data record and the middle-man data record;
   calculating, in response to the third score being less than the third pre-determined threshold, a fourth score representing a fourth similarity measure between the candidate data record and a combination of the target data record and the middle-man data record; and storing, in response to the fourth score exceeding a four pre-determined threshold, a combination of a portion of the target data record and a portion of the candidate data record as an expanded profile of the target entity.

4. The method of claim 1, further comprising:

analyzing the expanded profile to generate a aggregated record report of the target entity, wherein each of the plurality of data records comprises at least one selected from a group consisting of an OSN user profile, an email, and a VoIP call record comprising a header and a transcript of a VoIP call, wherein each of the plurality of entities comprise at least one selected from a group consisting of an OSN user, an email sender, and a VoIP caller, and wherein the target entity and the candidate entity are identified as being equivalent.

5. The method of claim 1, further comprising:

analyzing the expanded profile to identify a network error; and applying a corrective action of the network error to both the target entity and the candidate entity.

6. The method of claim 1, further comprising:

storing the plurality of indexes in a hash table; and using at least one of the target alphanumeric tokens as a key of the hash table to look up a value identifying the candidate entity in the hash table.

7. The method of claim 1, wherein calculating the first score is based on at least one comparison between the target alphanumeric tokens and a portion of the alphanumeric tokens extracted from the candidate data record.

8. The method of claim 7, further comprising:

storing the alphanumeric tokens in a data structure that is partitioned based on at least one selected from a group consisting of a class, a type, and a length of the alphanumeric tokens, wherein the class comprises a key attribute class, a derivable attribute class, and a statistical attribute class, wherein the type comprises an alphabetic type and a numeric type, and wherein the at least one comparison is performed using the data structure based on the at least one selected from a group consisting of the class, the type, and the length of the alphanumeric tokens.

9. The method of claim 8, further comprising:

selectively augmenting the alphanumeric tokens with a semantically equivalent addition, wherein the alphanumeric tokens is stored in the data structure with the semantically equivalent addition.

10. A system for comparing data records, comprising:

a processor; a data record tokenizer executing on the processor and configured to:

alphanumeric tokens from a plurality of data records, wherein the plurality of data records is generated by a plurality of entities, wherein the plurality of entities includes network devices, wherein the plurality of data records includes semi-structured data records and network management messages;

generate a plurality of indexes each referencing an entity of the plurality of entities by at least one of the alphanumeric tokens that is associated with the entity; and extract target alphanumeric tokens from a target data record of a target entity; and a data record matcher executing on the processor and configured to:

identify a candidate entity from the plurality of entities based on the target alphanumeric tokens and a first index of the plurality of indexes;

calculate a first score representing a first similarity measure between a candidate data record selected from the plurality of data records that belongs to the candidate entity and the target data record of the target entity; and the data record matcher further configured to:

store, in response to the first score exceeding a first pre-determined threshold, a combination of a portion of the target data record and a portion of the candidate data record as an expanded profile of the target entity.

11. The system of claim 10, the data record matcher further configured to:

identify, in response to the first score being less than a first pre-determined threshold, a middle-man entity from the plurality of entities based on the target alphanumeric tokens and a second index of the plurality of indexes;

calculate a second score representing a second similarity measure between a middle-man data record selected from the plurality of data records that belong to the middle-man entity and the target data record of the target entity;

calculate, in response to the second score exceeding a second pre-determined threshold, a third score representing a third similarity measure between the candidate data record and the middle-man data record; and store, in response to the third score exceeding a third pre-determined threshold, a combination of a portion of the target data record and a portion of the candidate data record as an expanded profile of the target entity.

12. The system of claim 10, the data record matcher further configured to:

identify, in response to the first score being less than a first pre-determined threshold, a middle-man entity from the plurality of entities based on the target alphanumeric tokens and a second index of the plurality of indexes;

calculate a second score representing a second similarity measure between a middle-man data record selected from the plurality of data records that belong to the middle-man entity and the target data record of the target entity;

calculate, in response to the second score exceeding a second pre-determined threshold, a third score representing a third similarity measure between the candidate data record and the middle-man data record;

calculate, in response to the third score being less than the third pre-determined threshold, a fourth score representing a fourth similarity measure between the candidate data record and a combination of the target data record and the middle-man data record; and store, in response to the fourth score exceeding a four pre-determined threshold, a combination of a portion of the target data record and a portion of the candidate data record as an expanded profile of the target entity.

13. The system of claim 10, further an information analyzer executing on the processor and configured to:

analyze the expanded profile to generate a aggregated record report of the target entity, wherein each of the plurality of data records comprises at least one selected from a group consisting of an OSN user profile, an email, and a VoIP call record comprising a header and a transcript of a VoIP call, wherein each of the plurality of entities comprise at least one selected from a group consisting of an OSN user, an email sender, and a VoIP caller, and wherein the target entity and the candidate entity are identified as being equivalent.

14. The system of claim 10, further an information analyzer executing on the processor and configured to:
analyze the expanded profile to identify a network error; and
applying a corrective action of the network error to both the target entity and the candidate entity.

15. The system of claim 10, the data record matcher further configured to:
store the plurality of indexes in a hash table; and use at least one of the target alphanumeric tokens as a key of the hash table to look up a value identifying the candidate entity in the hash table.

16. The system of claim 10, wherein calculating the first score is based on at least one comparison between the target alphanumeric tokens and a portion of the alphanumeric tokens extracted from the candidate data record.

17. The system of claim 16, the data record tokenizer further configured to:
store the alphanumeric tokens in a data structure that is partitioned based on at least one selected from a group consisting of a class, a type, and a length of the alphanumeric tokens,
wherein the class comprises a key attribute class, a derivable attribute class, and a statistical attribute class,
wherein the type comprises an alphabetic type and a numeric type, and
wherein the at least one comparison is performed using the data structure based on the at least one selected from a group consisting of the class, the type, and the length of the alphanumeric tokens.

18. The system of claim 17, the data record tokenizer further configured to:
selectively augment the alphanumeric tokens with a semantically equivalent addition, wherein the alphanumeric tokens is stored in the data structure with the semantically equivalent addition.

19. A non-transitory computer readable medium embodying instructions for comparing data records, the instructions when executed by a processor comprising functionality for:
extracting alphanumeric tokens from a plurality of data records, wherein the plurality of data records is generated by a plurality of entities, wherein the plurality of entities includes network devices, wherein the plurality of data records includes semi-structured data records and network management messages;
generating a plurality of indexes each referencing an entity of the plurality of entities by at least one of the alphanumeric tokens that is associated with the entity;
extracting target alphanumeric tokens from a target data record of a target entity;
identifying a candidate entity from the plurality of entities based on the target alphanumeric tokens and a first index of the plurality of indexes;
calculating a first score representing a first similarity measure between a candidate data record selected from the plurality of data records that belongs to the candidate entity and the target data record of the target entity; and
the instructions when executed by the processor further comprising functionality for:
storing, in response to the first score exceeding a first pre-determined threshold, a combination of a portion of the target data record and a portion of the candidate data record as an expanded profile of the target entity.

20. The method of claim 19, the instructions when executed by the processor further comprising functionality for:
identifying, in response to the first score being less than a first pre-determined threshold, a middle-man entity from the plurality of entities based on the target alphanumeric tokens and a second index of the plurality of indexes;
calculating a second score representing a second similarity measure between a middle-man data record selected from the plurality of data records that belongs to the middle-man entity and the target data record of the target entity;
calculating, in response to the second score exceeding a second pre-determined threshold, a third score representing a third similarity measure between the candidate data record and the middle-man data record; and
storing, in response to the third score exceeding a third pre-determined threshold, a combination of a portion of the target data record and a portion of the candidate data record as an expanded profile of the target entity.

21. The method of claim 19, the instructions when executed by the processor further comprising functionality for:
identifying, in response to the first score being less than a first pre-determined threshold, a middle-man entity from the plurality of entities based on the target alphanumeric tokens and a second index of the plurality of indexes;
calculating a second score representing a second similarity measure between a middle-man data record selected from the plurality of data records that belongs to the middle-man entity and the target data record of the target entity;
calculating, in response to the second score exceeding a second pre-determined threshold, a third score representing a third similarity measure between the candidate data record and the middle-man data record;
calculating, in response to the third score being less than the third pre-determined threshold, a fourth score representing a fourth similarity measure between the candidate data record and a combination of the target data record and the middle-man data record; and
storing, in response to the fourth score exceeding a four pre-determined threshold, a combination of a portion of the target data record and a portion of the candidate data record as an expanded profile of the target entity.

22. The method of claim 19, the instructions when executed by the processor further comprising functionality for:
analyzing the expanded profile to generate a aggregated record report of the target entity,
wherein each of the plurality of data records comprises at least one selected from a group consisting of an OSN user profile, an email, and a VoIP call record comprising a header and a transcript of a VoIP call,
wherein each of the plurality of entities comprise at least one selected from a group consisting of an OSN user, an email sender, and a VoIP caller, and
wherein the target entity and the candidate entity are identified as being equivalent.

23. The method of claim 19, the instructions when executed by the processor further comprising functionality for:
analyzing the expanded profile to identify a network error; and applying a corrective action of the network error to both the target entity and the candidate entity.

24. The method of claim 19, the instructions when executed by the processor further comprising functionality for:
storing the plurality of indexes in a hash table; and
using at least one of the target alphanumeric tokens as a key of the hash table to look up a value identifying the candidate entity in the hash table.

25. The method of claim 19, wherein calculating the first score is based on at least one comparison between the target alphanumeric tokens and a portion of the alphanumeric tokens extracted from the candidate data record.

26. The method of claim 25, the instructions when executed by the processor further comprising functionality for:
storing the alphanumeric tokens in a data structure that is partitioned based on at least one selected from a group consisting of a class, a type, and a length of the alphanumeric tokens,
wherein the class comprises a key attribute class, a derivable attribute class, and a statistical attribute class,
wherein the type comprises an alphabetic type and a numeric type, and
wherein the at least one comparison is performed using the data structure based on the at least one selected from a group consisting of the class, the type, and the length of the alphanumeric tokens.

27. The method of claim 26, the instructions when executed by the processor further comprising functionality for:
selectively augmenting the alphanumeric tokens with a semantically equivalent addition,
wherein the alphanumeric tokens is stored in the data structure with the semantically equivalent addition.

* * * * *